G. C. STACEY.
COTTON CLEANER.
APPLICATION FILED SEPT. 18, 1917.

1,369,716.

Patented Feb. 22, 1921.
2 SHEETS—SHEET 1.

Witness
J. Gordon Sparkes

Inventor
Grover C. Stacy
By
Attorney

G. C. STACEY.
COTTON CLEANER.
APPLICATION FILED SEPT. 18, 1917.

1,369,716.  Patented Feb. 22, 1921.
2 SHEETS—SHEET 2.

Witness
J. Gordon Parker

Inventor
Grover C. Stacy.
By
Attorney

UNITED STATES PATENT OFFICE.

GROVER CLEVELAND STACEY, OF ATLANTA, GEORGIA.

COTTON-CLEANER.

1,369,716.          Specification of Letters Patent.      Patented Feb. 22, 1921.

Application filed September 18, 1917. Serial No. 192,036.

*To all whom it may concern:*

Be it known that I, GROVER CLEVELAND STACEY, a citizen of the United States of America, residing at Atlanta, in the county of Fulton and State of Georgia, have invented certain new and useful Improvements in Cotton-Cleaners, of which the following is a specification.

My present invention relates to an apparatus for cleaning seed cotton in its passage through the suction feed apparatus to the gin.

It has heretofore been attempted to construct cleaners with rigid deflectors in the upper part of a casing, that was interposed in the suction feed line, to deflect the seed cotton against slats or screens forming an intermediate partition in the casing below the draft line, the idea being that in striking these slats or screens, the rocks, nails and foreign matter would be caught, and being below the draft line would readily separate themselves from the cotton and fall into a hopper which was normally closed to protect the suction.

I have found that such devices are capable of successful operation only where the air currents induced by the suction have the velocity for which the apparatus was designed and when this velocity becomes greater than or falls below such predetermined velocity, the apparatus becomes inefficient and in some cases practically inoperative.

The purpose of my present invention is to design a cleaning appara' is of the general type above referred to, which shall be independent in its operation of any fluctuations or variations in the suction feed of the cotton and which will reliably and accurately function under all operating conditions to clean the cotton and remove the heavier particles of foreign matter therefrom without in any manner injuring the fiber.

In the devices heretofore in use, in the event the suction was interrupted, cotton then in the apparatus was released to fall through the screen openings into the hopper and could only be recovered therefrom at expense and trouble. Therefore, a further object of my invention is to so design the cleaner, that, in the event of the interruption of the suction, it will continue to operate and will clean itself of cotton without causing any loss of the same.

A further object of my invention is to design and arrange in the cleaner casing a plurality of rotatable beaters to open up the cotton and to turn it over as it is passed from one to the other beater, thus causing all parts of the cotton locks to be driven by the beaters against the screen beneath them. The beater fingers are especially designed to avoid breaking or injuring the cotton fibers.

A further object is to provide the screen pockets under the beaters with bottom openings so designed that the cotton will not fall therethrough though heavier articles like nails, sticks or sand will pass freely therethrough. The last screen pocket has a raised lip to catch any foreign matter that may tend to work out of the pocket with the cotton and pass to the gins.

My invention further comprises the novel features of construction which are hereinafter more fully described, reference being had to the accompanying drawings which illustrate only the preferred embodiment of my invention, and in which:—

Similar reference numerals refer to similar parts throughout the drawings.

Figure 1:
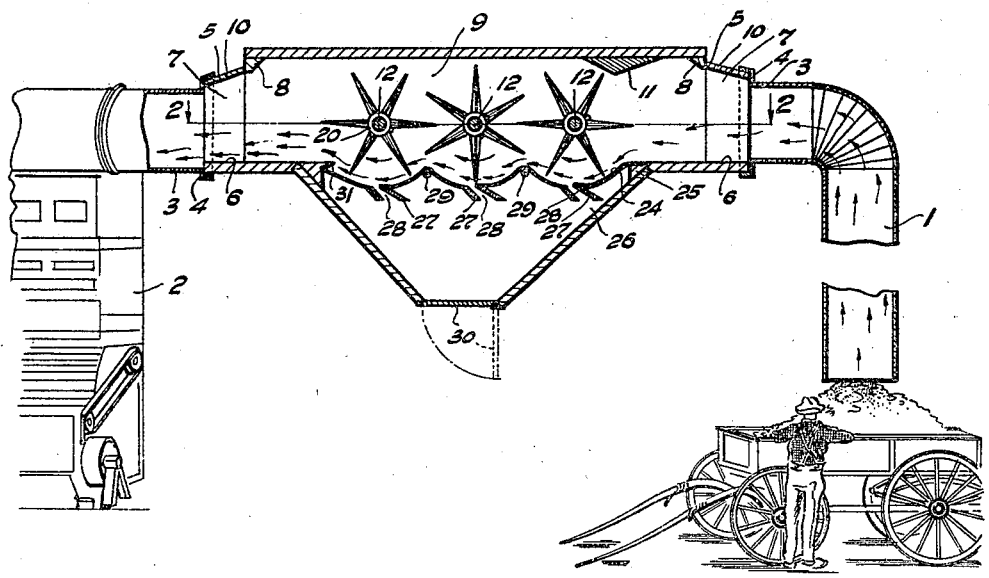
Figure 1 shows the apparatus in service with the cleaner illustrated in longitudinal vertical section.
Figure 3:
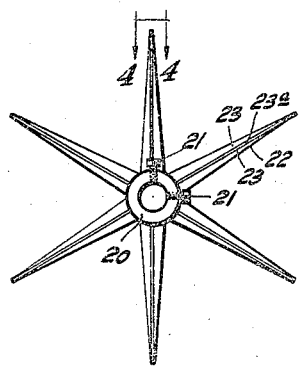
Fig. 3 is an enlarged detail view of the star like beater.

In the embodiment of my invention illustrated, I show the same combined with the intake end of a standard suction feed pipe 1 for cotton which is adapted to deliver cotton to the gins 2 responsive to the action of suction apparatus (not shown). This pipe 1 is interrupted and has coupled to its intermediate ends metallic pipe sections 3 each opening through the center of a metal sheet 4 which has marginal flanges adapted to fit over and be suitably fastened to the open ends of extensions 5 of the cleaner casing. These end extensions 5 are similar and are preferably made of wood with a horizontal bottom wall, vertical side walls 7 which flare outwardly symmetrically from the sheet 4 and join to a tapering batten 8 attached to the inner edges of the top and sides of the extension slopes upwardly and joins the batten 8 overhead, as seen in Fig. 1, and the batten 8 tapers inwardly toward the casing 9. The air and cotton thus flow through a gradually enlarging passage into a still larger cleaning casing, the object of this arrangement being to cause the cotton to move with gradually decreasing velocity and to pass relatively slowly through the cleaner casing which permits the cleaning apparatus which will now be described to act with the greatest efficiency in separating the foreign matter from the cotton. Near the batten 8 at the intake end of the casing 9 I provide a tapered deflector which extends across the top and tends to throw the cotton downwardly into the blades of the first beater and therefore to prevent the cotton being shunted over the beaters.

The cleaning apparatus, as illustrated, comprises three shafts 12, which extend from side to side through the cleaner casing 9, each shaft being mounted in bearings 13 fast on the bars 14 that are attached to the sides of the casing 9. The shaft ends project beyond their bearings on each side of the casing, and on the desired side of the casing I mount pulleys 15 on the shaft ends, the pulleys of the front and rear shafts being driven from the intermediate shaft by belts 16 and 17 running on pulleys 15 and 18 on said intermediate shaft which is driven by a pulley 19 from any suitable source of power.

Figure 4:
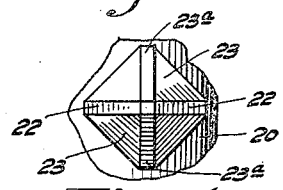
Fig. 4 is an end view of a beater blade as viewed from the line 4—4 of Fig. 3.
Figure 2:
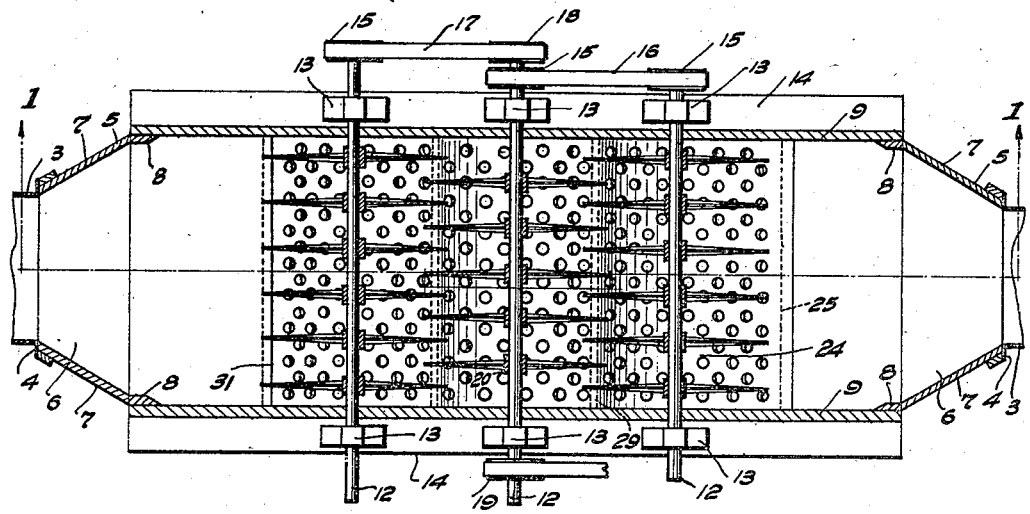
Fig. 2 is a horizontal sectional view on the line 2—2 of Fig. 1.
Figure 5:
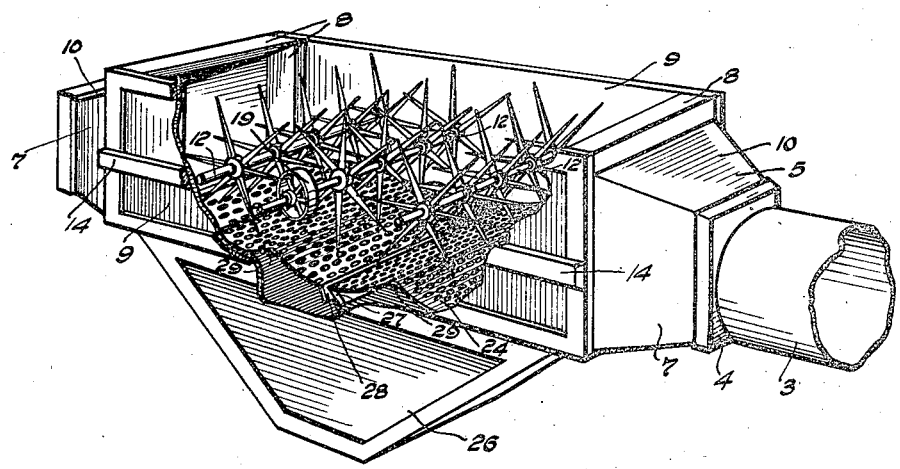
Fig. 5 is a perspective view of the cleaner with the casing side broken away and the casing top removed.

On each shaft I mount a series of star shaped beaters, each having a hub 20 extending sufficiently on each side beyond the beater blades arranged about its center, to receive set screws 21 by means of which it is made fast in the desired position on its respective beater shaft 12. The elongated blades of each beater are cast integral with their hub and they taper from the hub outwardly to a point and are reduced in thickness from the hub toward their ends. These blades in top plan view are seen in Fig. 4, wherein each is shown provided with narrow flat edges 22 connected on each side by outwardly flaring flat walls 23 to narrow flat side faces 23ª. In practice, the blades used have their flat edges 22 nearly one sixteenth of an inch in width so that the blades will have a long life before their cotton engaging edges are worn sharp enough to cut or damage the fiber of the cotton. As a preferred arrangement I employ six beater blades forming six longitudinal rows on the beater shafts, and I arrange six beaters on the end shafts and five on the intermediate shaft to give them a staggered arrangement. The beater blades are of such length as to cause them to pass between each other on adjacent shafts, as seen in Fig. 2, where it will be observed that ample lateral clearance is left between the blades to prevent any tearing or breaking of the fiber.

The beater shafts all rotate in the same direction, the first beater blades being adapted to drive the cotton, deflected to them by the batten 11, against a concave screen pocket 24 which is formed in two half sections, one of which has its upper edge connected to one side of a transverse block 25, the upper edge of which stands level with the bottom of the intake end of the casing and the sloping underface of which is mounted on one sloping wall of a hopper 26. The bottom edge of this screen section is made fast to a wooden cross bar 27 which extends from side to side of the hopper and has a downwardly inclined slot 28 formed therein and flaring toward its discharge end to prevent it becoming choked. The other half of the concave screen pocket and the adjacent half of the next screen pocket are formed by a sheet of perforated metal which at its center is supported on a cross rod 29 and which slopes with a curve in both directions from this cross rod 29. The reversely curved sides of each screen section form each a half of two adjacent concave pockets. The rear end pocket is formed like the front end pocket and the bottom of each pocket is supported by the transversely slotted bar 27. The inclined slots 28 in the bars 27 are left open above and uncovered by the screen. The duty on the screen is heavy, and I have obtained the best results from a 16 to 20 gage galvanized iron perforated. The slots 28 incline upwardly at an acute angle to the movement of the cotton over them, the angle being such that the sloping overhead wall of the slot overhangs the underneath wall of the slot, so that the cotton will be driven or wiped over the slot opening without having a tendency to drop therethrough, whereas the foreign matter, which is heavier, has a tendency to drop into the slots instead of passing over them, or, having passed the slot, to work back down the far curved wall of the pocket and enter the slot through which it falls into the hopper which has a normally closed discharge door 30. Below each beater shaft I provide a concave screen pocket of the character described, and to prevent the foreign matter, that is driven up the curved outlet side wall of the last pocket by the last beater, escaping from the casing, I provide a transverse raised stop rib 31 formed by a portion of the sheet metal from which the perforated screen is formed and I set it so as to clear the blades and yet to engage and prevent any rocks, nails or like matter that is driven up the screen, working past it.

The beaters are so disposed relatively that as each delivers the cotton to the succeeding beater the latter engages the uppermost face of the cotton as presented to it and turns it over and presents it to the succeeding shaft which in turn again inverts it, thus causing the cotton to be successively turned over and loosened up so that it will free itself of sand, rocks and foreign matter therein and cause the latter to fall to the bottom of the screen pockets and through slots 28 into the hopper bottom. The smaller particles of sand and dirt will pass directly through the perforations of the screen pockets, but the larger particles will make their escape through the slots 28. The beater shafts draw the cotton below the line of draft as they pass it over the screen pockets and it is thereby loosened up and thus caused to more freely release the foreign matter. The action of the beater blades will not tear the cotton but will open it up when damp or wet and, due to their centrifugal action, they will also tend to enable wet cotton to throw off foreign matter as well as to relieve it of excess moisture, thus delivering it, in a suitable condition for ginning, to the gins.

What I claim as new and desire to secure by Letters Patent, is:—

1. In a cotton cleaner comprising a casing and a rotary beater, a screen pocket below the beater having an elongated transverse bottom opening, and spaced downwardly divergent and rearwardly inclined cross members to support the screen edges along the sides of said opening with the near edge of the incoming cotton raised substantially above the far edge and underhung by the cross member supporting said far edge.

2. In a cotton cleaner having a cleaner casing and beaters rotatably mounted in said casing in the path of the cotton, a concave screen pocket under said beaters, there being a transverse slot lengthwise of and located in the bottom of said pocket, said slot having its near edge to the incoming cotton substantially nearer the beater than its far edge, and a downwardly flaring rearwardly inclined passage formed by spaced walls disposed under said slot.

3. In a cotton cleaner having a casing and a rotatable beater therein, a foraminous concave under said beater, a bottom transverse slot in the concave, and an overhanging lip at the far edge of the concave spaced substantially above the level of the concave and adapted to catch and arrest the outward passage of heavy foreign matter, substantially as described.

In testimony whereof I affix my signature.

GROVER CLEVELAND STACEY.

Witness:
    NOMIE WELSH.